US005935409A

United States Patent [19]

King et al.

[11] Patent Number: 5,935,409

[45] Date of Patent: Aug. 10, 1999

[54] FLUOBORIC ACID CONTROL IN A FERRIC FLUOBORATE HYDROMETALLURGICAL PROCESS FOR RECOVERING METALS

[75] Inventors: Michael G. King, Salt Lake City; Shijie J. Wang, Sandy; Venkoba Ramachandran, Salt Lake City, all of Utah

[73] Assignee: ASARCO Incorporated, New York, N.Y.

[21] Appl. No.: 09/048,528

[22] Filed: Mar. 26, 1998

[51] Int. Cl.[6] .......... C25C 1/00

[52] U.S. Cl. .......... 205/560; 205/580; 205/599; 205/604

[58] Field of Search .......... 205/560, 580, 205/599, 604

[56] References Cited

U.S. PATENT DOCUMENTS

| | | | |
|---|---|---|---|
| 4,046,687 | 9/1977 | Schulze . | |
| 4,834,951 | 5/1989 | Schwab et al. . | |
| 4,927,510 | 5/1990 | Olper et al. . | |
| 5,039,337 | 8/1991 | Olper et al. . | |
| 5,281,336 | 1/1994 | Dalton et al. . | |
| 5,372,684 | 12/1994 | Zoppi . | |
| 5,393,431 | 2/1995 | Campbell et al. . | |
| 5,441,609 | 8/1995 | Olper . | |
| 5,762,683 | 1/1998 | Jackson et al. | 75/743 |

FOREIGN PATENT DOCUMENTS

| | | |
|---|---|---|
| 0 562 709 A2 | 2/1993 | European Pat. Off. . |
| 0 562 709 A3 | 2/1993 | European Pat. Off. . |

OTHER PUBLICATIONS

The Production of Electrolytic Lead and Elementary Sulphur from Lead Sulfide Concentrates, Chapter 69, pp. 1148–1164, by Marco Olper and Massimo Maccagni, B.U.S. Engitec Servizi Ambientali s.r.l., V.le Jenner, 51, Milan, Italy. No date available.

The Solvent Extraction and Ion Exchange Removal of As, Sb, and Bi, from Copper Sulphate–Sulphuric Acid Solutions, by Dreisinger et al., Chapter 49, pages 801–815, The University of British Columbia, Dept. of Metals and Materials Engineering, Vancouver, B.C., Canada V6T 1Z4. No date available.

*Primary Examiner*—Kathryn Gorgos
*Assistant Examiner*—Wesley A. Nicolas
*Attorney, Agent, or Firm*—DeLio & Peterson, LLC; Kenneth A. Koch

[57] ABSTRACT

A method is provided for the hydrometallurgical recovery of metal values from metal sources containing more than one metal such as antimony, lead, copper, zinc, bismuth, tin, cadmium and other metals by leaching the metal containing source with a ferric fluoborate/fluoboric acid solution to provide a metal containing leach solution. The leach solution is extracted with organic extractants, ion exchange resins and the like to provide a loaded extract and a raffinate which contains fluoboric acid produced in the extraction step. The fluoboric acid concentration is controlled (reduced) in the raffinate by adding to the raffinate a metal oxide of a metal in the raffinate to form an acid adjusted raffinate. The acid adjusted raffinate is then electrowon or otherwise treated to form the desired metal and to provide a ferric fluoborate solution which is recycled for leaching additional metal containing material. When the metal containing material is a copper bearing material, a copper containing raffinate is treated with copper oxide to control the fluoboric acid in the raffinate. Likewise, when the metal containing material is a lead or zinc bearing material, lead oxide and zinc oxide, respectively, would be used to control formed fluoboric acid in the lead or zinc containing raffinate.

10 Claims, 3 Drawing Sheets

FLUOBORIC ACID CONTROL IN A FERRIC FLUOBORATE HYDROMETALLURGICAL PROCESS FOR RECOVERING METALS

BACKGROUND OF THE INVENTION

1. Field of the Invention

This invention relates generally to the separation and recovery of metals from concentrates and other metal containing materials and, in particular, to a process using a ferric fluoborate solution to leach concentrates and solubilize the metals and then to extract at least some of the metals particularly impurity metals using organic extractants, ion exchange resins and the like to form metal containing raffinate solutions from which metals can be recovered by electrowinning or other recovery processes. The fluoborate metal containing raffinate solution contains fluoboric acid produced in the extraction step which acid is controlled by converting the acid to a metal fluoborate before the recovery step.

2. Description of Related Art

The separation of metals from their ores or other materials such as sludges, concentrates, residues, waste products, baghouse dusts and the like is well known. Over the years, for example, lead has been produced from ores such as galena by thermal means such as roasting followed by smelting and refining. Roasting or sintering processes require environmental controls because of emissions such as $SO_2$ if the feed to the process is a sulfide ore. Because of these problems hydrometallurgical processes have been developed which are typically environmentally preferred.

A hydrometallurgical process for producing electrolytic lead from galena concentrate is shown in U.S. Pat. No. 5,039,337 to M. Olper and P. Fracchia, which patent is hereby incorporated by reference. In this process galena concentrate is leached with an aqueous solution of ferric fluoborate and fluoboric acid with ferrous fluoborate, lead fluoborate and elemental sulfur being formed according to the reaction:

$$2Fe\,(BF_4)_3+PbS \rightarrow 2Fe(BF_4)_2+Pb(BF_4)_2+S$$

The solid residue composed of elemental sulfur and gangue is separated and the solution of ferrous fluoborate and lead fluoborate is sent to a diaphragm electrolytic cell wherein pure lead is deposited at the cathode and at the anode ferrous ion is oxidized to ferric ion. The solution of ferric fluoborate regenerated at the anode is recycled to the leaching step.

The above ferric fluoborate process may also be used to leach other "impure" lead sources such as lead bullion, lead smelter speiss and matte and secondary lead materials such as from batteries. Similarly, for these processes, the lead source is leached to form a lead fluoborate and ferrous fluoborate solution which is then electrolyzed in a diaphragm electrolytic cell.

While the ferric fluoborate leaching process is a preferred method in the lead industry, impurities and/or byproducts in the leach solution adversely impact the process and are preferably removed and recovered before the electrolysis step of the process. Impurities such as antimony, bismuth and tin present in the concentrate when leached are particularly troublesome and, if not removed from the leach solution, will result in an "impure" lead product being formed at the cathode and cause other processing problems.

Other ores and metal containing materials are also desirably treated to separate and recover their metal values by hydrometallurgical processes. For example, the mineral tetrahedrite having the general formula $(Cu,Fe)_{12}Sb_4S_{13}$ is typically concentrated to form a material containing a mixture of copper and antimony sulfides with ancillary silver and having the general formula $Cu_2S.\ Sb_2S_3(+Ag_2S)$. Other sulfide copper ores include bornite, chalcopyrite, chalcocite and covellite. Similarly, zinc concentrates, typically containing lead and/or copper sulfides and like materials, are also desirably treated by hydrometallurgical processes to separate and recover their metal values.

Copper bearing materials for hydrometallurgical recovery processes include copper sulfide concentrates with varying amounts of iron and impurities such as antimony, arsenic and bismuth, white metal, copper matte and blister, scrap and anodes. Processing of the copper bearing material generally comprises leaching the material, removing the impurities and/or byproducts from the leach solution and electrowinning the leach solution to recover the copper.

A ferric fluoborate leach solution has been found to be useful to treat the above and other metal containing materials to separate and recover the metals. In the ferric fluoborate leach process and in other leach processes, metal containing solutions are formed which may be electrowon or otherwise processed, e.g., by precipitation, to form commercial metal products. This usually requires that the fluoborate leach solution be treated to separate unwanted metals or impurities from the leach solution by using extractants such as organic extractants, ion exchange resins and the like (hereinafter generally referred to as extractants). The organic extractants are essentially water immiscible and form an extract phase and raffinate phase. The metal to be recovered may also be recovered by extracting (separation) from the fluoborate leach solution.

These extractants are typically "hydrogen based" in that, when used, the removal of metals or impurities from the leach solution is accompanied by the generation of fluoboric acid in the extracted leach solution commonly termed raffinate. The fluoboric acid in the raffinate does not contribute to regeneration of ferric fluoborate needed for recycling. The ferric fluoborate concentration will decrease to zero unless the fluoborate ions (which are transferred from bonding with metal ions to hydrogen ions in the extraction process) are eventually returned to bonding with iron ions. Since the process requires the repeated use of regenerated ferric fluoborate, it is necessary to control the formation of fluoboric acid in the system. For example, in U.S. Pat. No. 5,039,337 to Olper et al., supra, if it is necessary to remove impurities such as antimony and tin from the leach solution before electrowinning, the overall effectiveness of the process will be compromised by the formation of fluoboric acid in the raffinate in the impurity extraction step.

Bearing in mind the problems and deficiencies of the prior art, it is therefore an object of the present invention to provide a method for the control of the concentration of fluoboric acid in a raffinate solution formed in the ferric fluoborate treatment of metal containing materials when an extractant is used to selectively remove a metal or impurity metal from the leach solution.

It is another object of the present invention to provide a method for the hydrometallurgical treatment of metal containing materials such as lead, zinc, and copper metal containing materials, and mixtures thereof, using a ferric fluoborate solution as a leachant whereby the concentration of fluoboric acid generated during the process in a raffinate solution is controlled so that the solution can be effectively electrowon forming a ferric fluoborate containing solution for recycling and the leaching of additional metal containing material.

Other objects and advantages of the present invention will be readily apparent from the following description.

SUMMARY OF THE INVENTION

The above and other objects and advantages, which will be apparent to one of skill in the art, are achieved in the present invention which is directed, in a first aspect, to a method for the hydrometallurgical treatment of metal containing materials containing at least two metals, preferably at least one of which is copper, lead, or zinc, using a ferric fluoborate leach solution to separate at least two of the metals from the metal containing material and then to extract at least one of the metals from the leach solution during the process comprising the steps of:

- contacting a metal containing material containing at least two metals with a ferric fluoborate leachant solution, preferably containing fluoboric acid, to form a first leach solution comprising at least two metals;
- treating the first leach solution with an extractant which selectively separates (extracts) at least one metal from the first leach solution forming a first loaded extract and a first raffinate, the first raffinate containing fluoboric acid formed by the extraction step;
- adding to the first raffinate a metal oxide of a metal in the first raffinate, preferably the major metal in the solution, in an amount which lowers the amount of fluoboric acid in the first raffinate and forming a first acid adjusted raffinate;
- electrowinning the first acid adjusted raffinate to form a metal product and to form a ferric fluoborate solution; and
- recycling the ferric fluoborate solution to the contacting step.

A ferric fluoborate solution has been found to be especially effective to leach metal values from a wide range of metal containing sources and, for convenience, the term "ferric fluoborate" will include ferric fluoborate/fluoboric acid solutions. The metal containing materials may be ores, concentrates, sludges, residues, waste materials, baghouse dusts, smelter byproducts, mattes, reverts, slags and other such metal containing materials. In one aspect of the invention, the highest concentration metal in the metal containing material (termed "major metal") is the metal desired to be recovered. For example, copper would be recovered in a copper bearing material, with the other metals in the material either being byproducts or impurities. The impurities are removed (extracted) from the major metal so that the major metal may be electrowon to form a pure metal product. Metal containing materials are generally contemplated herein wherein the major metal component of the material is either lead, zinc or copper. These metals will typically be in the form of sulfides or in the elemental state such as in scrap. Other metals such as antimony, bismuth, tin, arsenic, silver, gold, and the like are typically present in the material in lesser amounts as byproducts or impurities.

Broadly stated, the invention is directed to the use of ferric fluoborate solutions to leach the above metal containing materials and then to extract metal impurities and/or metals from the leach solution to produce a raffinate which is then treated with a metal oxide, preferably a metal oxide of the major metal in the raffinate, to control fluoboric acid formed in the raffinate during the extraction step. The addition of the metal oxide converts fluoboric acid to a corresponding metal fluoborate which may be effectively electrolyzed in the electrowinning step with the existing metal fluoborate to form a metal product (such as copper) and to oxidize ferrous fluoborate to ferric fluoborate which may be recycled to the leaching step.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
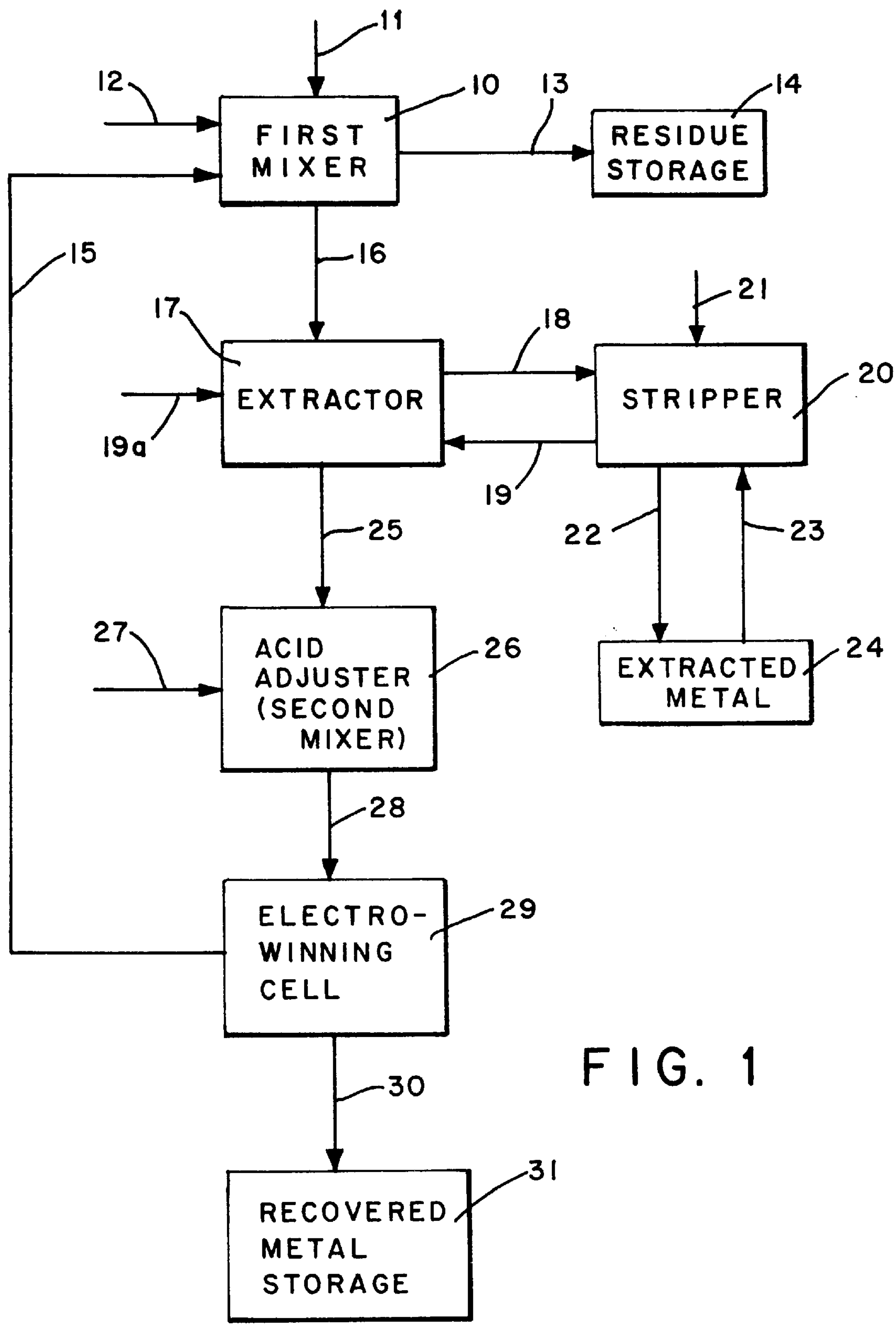
FIG. 1 is a flow diagram showing a method of the invention.

In describing the preferred embodiments of the present invention, reference will be made herein to FIGS. 1—3 of the drawing in which like numerals refer to like features of the invention. Features of the invention are not necessarily shown to scale in the drawings.

The metal containing source may be any suitable material such as ores, concentrates, residues and wastes. Exemplary materials include tetrahedrite concentrates, zinc concentrates, slags, galena concentrates, lead bullion, lead smelter speiss and matte, lead concentrates and secondary lead such as obtained from batteries, copper concentrates and copper bearing materials. The metal containing source is preferably granulated or finely divided to enhance the leaching operation.

The metal source is leached with a leachant solution of ferric fluoborate containing preferably a stoichiometric amount of ferric ion to solubilize the metals to be leached and more preferably an excess amount and is generally about 20 to about 100 or 150 grams per liter (g/l) ferric ion, or more, preferably about 60 to about 100 g/l, e.g., 80 g/l ferric ion. The ferric fluoborate solution also preferably contains fluoboric acid in an amount of about 5 to about 48 weight percent or more of the leachant solution, preferably 12 to about 18 percent. The present invention is primarily directed to the control of fluoboric acid formed in the process which is in excess of the amount used for leaching.

The leaching process is usually conducted at room temperature but may vary from about 20° C. to any suitable temperature such as 40° C.–80° C. or higher depending on the leach time desired, the metal source and its physical shape. Leach time may also vary widely and is usually about 5 minutes to 8 hours or higher, typically about 1 to 3 hours.

After leaching, the metal source/leach mixture is filtered or otherwise separated to remove residue solids such as gangue. The separated first leach solution generally contains ferrous fluoborate, metal fluoborates and unreacted ferric fluoborate and fluoboric acid.

The separated first leach solution which contains at least two metals and typically more is now contacted with an extractant material which will extract at least one of the metals from the separated first leach solution to form a first raffinate and a first extract. In most cases, the metal desired to be recovered is not extracted from the first leach solution. Typically, the metal or metals extracted will be byproducts or impurities so that a metal containing solution is obtained which can be electrowon to form the metal product preferably as a commercially pure product. In any event, contact of the first separated leach solution with a "hydrogen ions" generating extractant such as an organic extractant, ion exchange resin, or the like provides a first raffinate which is higher in fluoboric acid than the separated first leach solution because of the extraction step. Typical extractants include organophosphoric acid esters, amidobis (thiophosphoryl) compounds, aldoximes, tributyl phosphate, ion exchange resins and the like. Exemplary extractants are disclosed and discussed in U.S. Pat. No. 4,046,687; 4,834,951; and 5,393,431, which patents are incorporated herein by reference.

The first raffinate is now treated with a metal oxide to reduce the fluoboric acid level of the raffinate. The treated raffinate is now in condition for electrowinning or may be further extracted to remove additional impurities. Referring to U.S. Pat. No. 5,039,337, supra, when a lead containing source is leached with ferric fluoborate solution, the raffinate formed after extraction to remove impurities is treated with lead oxide to form an acid adjusted first raffinate solution which is sent to a diaphragm electrolytic cell wherein pure lead is deposited at the cathode and the solution, partially deprived of lead or other metal, is sent to the anodic compartment wherein the oxidation of ferrous fluoborate to ferric fluoborate takes place. The regenerated solution of ferric fluoborate is then recycled to the leaching step. A similar process would be used for other metal containing materials such as copper bearing materials where a copper product would be produced by electrowinning and copper oxide would be used to control the excess fluoboric acid.

For some metal containing materials, multiple extraction steps may be needed to extract metals and/or impurities from the fluoborate leach solution. If multiple extraction steps are used, a metal oxide may be added after any of the extraction steps. The metal oxide may also be added at the end of all the extraction steps and before the electrowinning process.

Referring to FIG. 1, a method of the invention may generally be demonstrated. A metal containing material 11 is fed into a first mixer 10 with a ferric fluoborate solution 12. The solution will typically also contain fluoboric acid as described hereinabove. Also shown being fed into first mixer 10 is a recycle stream 15 which will also be a ferric fluoborate solution and which is obtained from electrowinning cell 29. After mixing, a residue 13 is removed and stored in holding area 14 for further processing or disposal.

The first leachant solution 16 is fed into an extractor 17 with an extractant 19 and 19*a*. The extractant 19 is recycled from an extractant stripping step 19 and may also be termed stripped extractant. Extractant 19*a* is new extractant or make-up extractant. After mixing, a first loaded extract 18 is fed into stripper 20. An acid 21 or other stripper material is fed into stripper 20 to separate the metal or impurity in the first loaded extract 18 into stripped stream 22 which is fed into tank 24 for recovery or disposal. Recycle acid 23 may be used for additional stripping. Stripped extractant 19 is fed from stripper 20 into extractor 17 to extract new first leachant solution 16.

The first raffinate 25 from extractor 17 is fed into a second mixer (acid adjuster) 26. The first raffinate 25 contains fluoboric acid formed in the extractor 17 which is controlled for the electrowinning step or further processing. A metal oxide 27 is also fed into second mixer 26 and the metal oxide reacts with fluoboric acid in the first raffinate 25 to form an acid adjusted first raffinate 28 which now contains a metal fluoborate reaction product, leached metal fluoborate and water formed from the metal oxide reaction. The metal fluoborate containing acid adjusted first raffinate stream 28 is fed from second mixer 26 to electrowinning cell 29. In electrowinning cell 29 the metal fluoborate solution is electrowon to form metal 30 which is stored in area 31. The generated ferric fluoborate solution 15 is recycled to first mixer 10 to leach new metal containing material 11 added to the first mixer 10.

Figure 2:
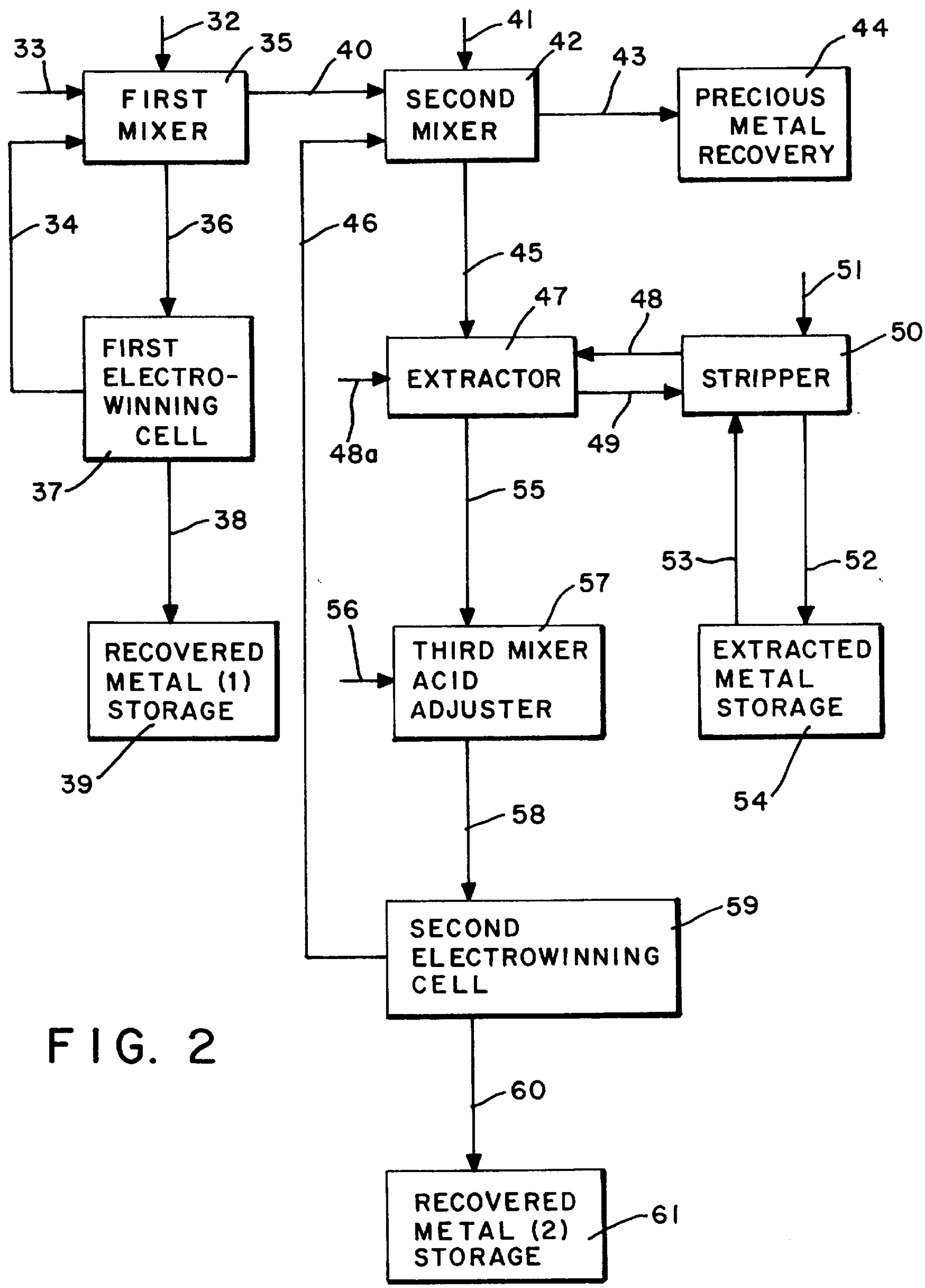
FIG. 2 is a flow diagram showing a method of the invention employing two metal electrowinning steps.

Referring now to FIG. 2, a method of the invention is shown employing two electrowinning steps to provide at least two metal products. A metal containing material 33 is fed into first mixer 35 with a ferric fluoborate solution 32. Also fed into first mixer 35 is a recycle ferric fluoborate solution 34 from first electrowinning cell 37. After mixing, a first leachant solution 36 is fed into first electrowinning cell 37. The electrowinning process provides a first metal product 38 which is stored in storage area 39. A ferric fluoborate solution 34 generated in first electrowinning cell 37 is fed as a recycle stream to first mixer 35.

The residue 40 from first mixer 35 is fed into second mixer 42 with a ferric fluoborate leach solution 41. After mixing, any remaining residue 43 is removed for storage in storage area 44. This residue will typically contain metals such as precious metals which are not soluble in the ferric fluoborate solution and metals in this material may be recovered following conventional techniques. The second leachant solution 45 is fed into extractor 47 with recycle stripped extractant 48 and/or new extractant 48*a*. The first loaded extract 49 containing the metals extracted by the extractant 48/48*a* is fed into stripper 50. The first loaded extract 49 is stripped with an acid or other such material 51 to form a metal containing solution 52 from which metals may be recovered in step 54. Acid 53 recovered from recovery step 54 may be recycled to stripper 50. After stripping, the stripped extractant 48 is fed to extractor 47 to extract new second leachant solution 45.

The first raffinate 55 is fed into third mixer (acid adjuster) 57 with a metal oxide 56. The first raffinate 55 contains excess fluoboric acid due to the extraction step 47 and the metal oxide 56 reacts with the fluoboric acid to form a metal fluoborate.

After mixing in third mixer 57, the acid adjusted first raffinate 58 is fed into second electrowinning cell 59. Electrowon metal product 60 is fed to storage area 61 and a regenerated ferric fluoborate solution 46 is recycled to second mixer 42 for leaching of additional residue 40.

Figure 3:
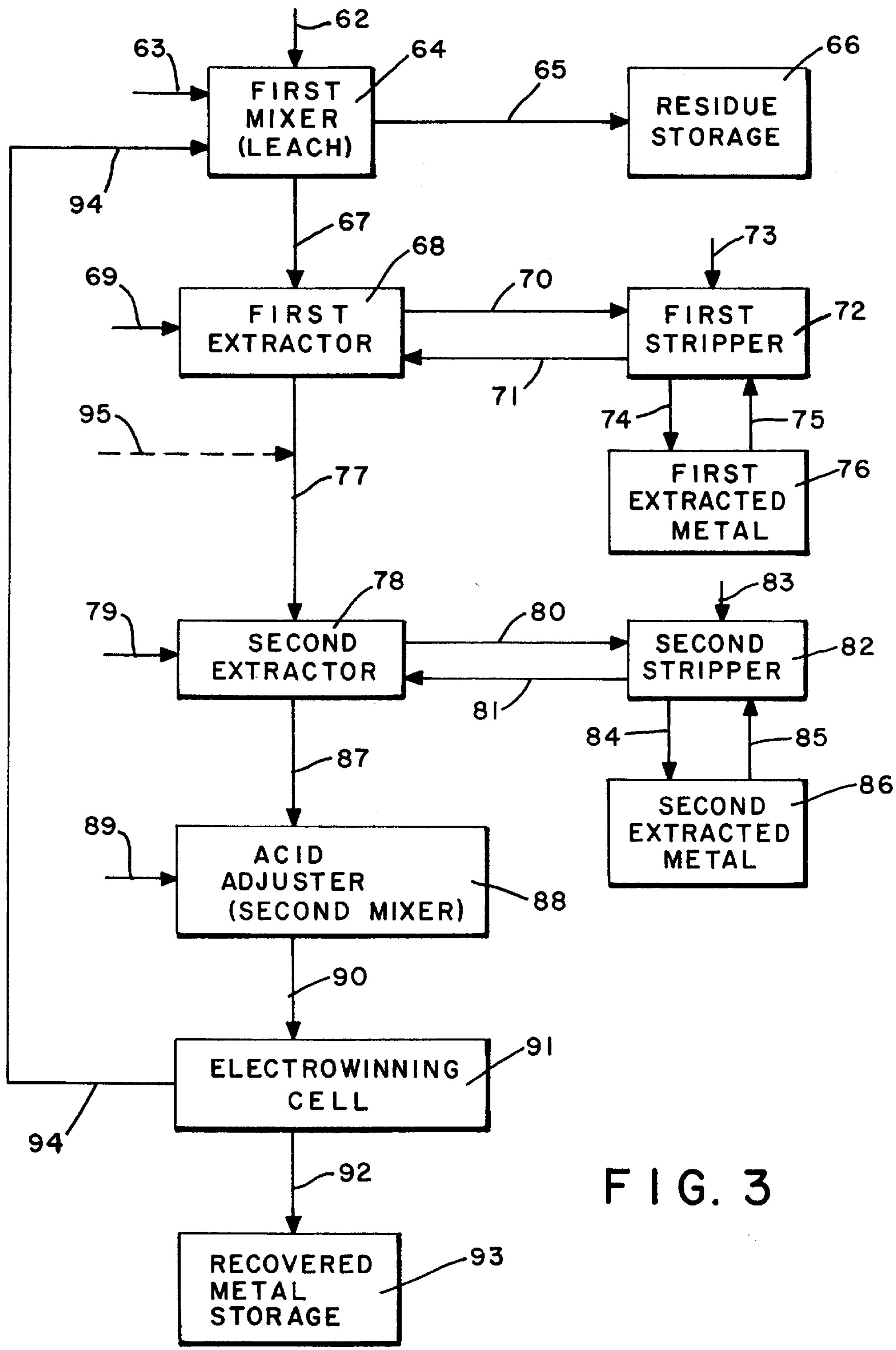
FIG. 3 is a flow diagram showing a method of the invention employing two metal extraction steps.

Referring to FIG. 3, a method of the invention employing two extraction steps may be demonstrated. A metal containing material 62 is fed into a first mixer 64 with a ferric fluoborate solution 63. The solution will typically also contain fluoboric acid as described hereinabove. Also shown being fed into first mixer 64 is a recycle steam 94 which will also be a ferric fluoborate solution which is obtained from electrowinning cell 91. After mixing, a residue 65 is removed and stored in holding area 66 for further processing or disposal.

The first leachant solution 67 is fed into first extractor 68 with an extractant 69 and recycle extractant 71. The extractant 71 is recycled from an extracting stripping step 72 and may also be termed stripping extractant. Extractant 69 is new extractant or make-up extractant. After mixing, a first loaded extract 70 is fed into first stripper 72. An acid 73 or other stripper material is fed into first stripper 72 to separate the metal or impurity in the first loaded extract 70 into stripped stream 74 which is fed into tank 76 for recovery or disposal. Recycle acid 75 may be used for additional stripping. Stripped extractant 71 is fed from first stripper 72 into first extractor 68 to extract new first leachant solution 67.

The first raffinate 77 from first extractor 68 is fed into a second extractor 78. The first raffinate 77 contains fluoboric acid formed in first extractor 68 which is to be controlled for the electrowinning step and for further processing. An extractant 79 and recycle extractant 81 is fed into second extractor 78 and mixed with first raffinate 77. After mixing, a second loaded extract 80 is fed into second stripper 82. An acid 83 or other stripper material is fed into second stripper 82 to separate the metal or impurity in the second loaded extract 80 into stripped stream 84 which is fed into tank 86 for recovery or disposal. Recycle acid 85 may be used for additional stripping. Stripped extractant 81 is fed from second stripper 82 into second extractor 78 to extract new first raffinate 77.

The second raffinate 87 from second extractor 78 is fed into a second mixer (acid adjuster) 88. The second raffinate contains fluoboric acid formed in the first extractor 68 and second extractor 78 and is to be controlled for the electrowinning step or further processing. A metal oxide 89 is also fed into second mixer 88 and the metal oxide reacts with fluoboric acid in the second raffinate 87 to form an acid adjusted second raffinate 90 which now contains a metal fluoborate reaction product, leached metal fluoborate and water formed from the metal oxide reaction. The metal fluoborate containing acid adjusted second raffinate 90 is fed from second mixer 88 to electrowinning cell 91. In electrowinning cell 91, the metal fluoborate solution is electrowon to form metal 92 which is stored in area 93. The regenerated ferric fluoborate solution 94 is recycled to first mixer 64 to leach new metal containing material 62 added to the first mixer 64.

When two extraction steps are used as shown in FIG. 3 (or more depending on the process) acid adjustment may be necessary after each extraction step. This is necessary because the raffinate formed may have a different pH due to the extraction step and the pH may have to be adjusted depending on the effectiveness of the extractant used in the next extraction step at the new pH. Dotted line 95 indicates such an acid adjustment step. Only one (1) actual acid adjustment step is shown in FIG. 3 for convenience. Acid adjustment may be made by using a metal oxide. Or the adjustment may be made by addition of conventional acid or base to obtain the pH desired for the next extraction.

For minerals such as tetrahedrite concentrate, the fluoborate leach solution will contain metal values containing a significant amount of antimony (about 30 g/l) and copper (about 35 g/l) and lower amounts of lead (about 2 g/l), zinc (about 2 g/l), bismuth (about 3 g/l) and arsenic (about 3 g/l). For this type material the process shown in FIG. 3 is preferred. Thus, after leaching, the fluoborate leach solution 67 is preferably contacted with an organic extractant 69, 71 such as an organophosphoric acid ester to selectively remove antimony and bismuth from the fluoborate solution. The first raffinate fluoborate solution 77 will then contain a large amount of copper and lesser amounts of arsenic, lead and zinc. Arsenic, zinc and lead are then preferably separated from the first raffinate solution 77 leaving a second raffinate copper fluoborate solution 87 which second raffinate may be electrolyzed to form a copper product. Copper oxide 89 is added to the copper fluoborate second raffinate solution 87 in acid adjuster 88 to control fluoboric acid in the solution formed by the extraction steps.

In a preferred process for tetrahedrite concentrate, the process as shown in FIG. 3 is used as follows. The fluoborate leach solution 67 is contacted with an organic extractant 69,71 such as an aldoxime to selectively remove copper from the fluoborate leach solution 67 in loaded extractant 70. The copper is stripped from the extract and recovered by, e.g., electrowinning. The first raffinate fluoborate solution 77 will then contain a large amount of antimony and lesser amounts of lead, zinc, bismuth and arsenic. Lead, zinc, bismuth and arsenic are then separated from first raffinate solution 77 in second extractor 78 using organic extractants 79,81 such as amidobis (thiophosphoryl) compounds and tributyl phosphate . The second raffinate antimony fluoborate solution 87 is contacted in acid adjuster 88 with antimony oxide 89 to control the fluoboric acid in the second raffinate 87. The acid adjusted second raffinate 90 is then electrowon in cell 91 providing an antimony product 92. Ferric fluoborate 94 is recycled to first mixer 64.

In a preferred process for copper bearing materials, the process as shown in FIG. 3 is used as follows. The fluoborate leach solution 67 is contacted with an organic extractant 69,71 such as an organophosphoric acid ester to selectively remove antimony and bismuth from the fluoborate leach solution 67 in loaded extractant 70. The first raffinate fluoborate solution 77 will then contain a large amount of copper and lesser amounts of arsenic. Arsenic is then extracted from first raffinate solution 77 in second extractor 78 using organic extractant 79,81 such as tributyl phosphate. The second raffinate copper fluoborate solution 87 is contacted in acid adjuster 88 with copper oxide 89 to control the fluoboric acid in the second raffinate 87 and form an acid adjusted second raffinate 90. The acid adjusted second raffinate 90 is then electrowon in cell 91 providing a copper product 92. An iron bleed from the system may be needed to control the iron level in the system. Iron can be bled from electrowinning cell 91.

Another application for the invention is the direct recovery of zinc from high grade zinc concentrates which are typically in sulfide form. The fluoborate leach solution will contain zinc, some iron and metal contaminants. An organic extractant or ion exchange resin may be employed to remove the contaminants from the zinc fluoborate leach solution. The raffinate fluoborate solution may then be contacted with zinc oxide to lower the amount of fluoboric acid generated in the raffinate by the extraction. The acid adjusted raffinate can then be used for electrowinning zinc and the recycling of ferric fluoborate.

High grade lead concentrates typically contain greater than 70% lead and some zinc. The concentrates may be leached with a ferric fluoborate solution to leach lead and zinc. If the zinc is removed from the leachant solution by an extraction process, the raffinate is treated with lead oxide to reduce the fluoboric acid concentration of the raffinate. If there is any copper in the leach solution, an aldoxime may be used to remove copper in an extract phase, which phase can then be treated to recover the copper. The raffinate is then treated with lead oxide and then electrowon. A typical high grade level concentrate contains about 76% lead, 1.3% zinc and 0.5% copper.

Chalcopyrite concentrates ($CuFeS_2$) may contain significant amounts of zinc, about 5%, and can be leached with a ferric fluoborate solution to dissolve copper, iron and zinc. Zinc is then extracted from the leach solution and copper oxide added to the raffinate, which acid adjusted raffinate can then be electrowon to form a copper product.

Baghouse dusts which typically contain about 30% lead, 15% zinc and 15% cadmium may be leached with ferric fluoborate to dissolve lead, zinc and cadmium. Unfumed lead slags contain both lead and zinc as metals of value. Leached with ferric fluoborate, the lead, zinc and cadmium in the slag will dissolve. Other metal containing materials may similarly be treated.

The amount of metal oxide used may vary widely and is generally added in an amount to lower the fluoboric content of the raffinate to a desired level, e.g., 12–18 weight %. If, for example, the raffinate contains excess fluoboric acid, a stoichiometric amount of metal oxide according to the following equation would be used:

$$MO+(X)HBF_4 \rightarrow M(BF_4)_x+H_2O$$

wherein M is a metal such as copper, lead, zinc, etc. having a valence x.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for the hydrometallurgical treatment of metal containing materials containing at least two metals, using a ferric fluoborate leach solution to separate at least two of the metals from the metal containing material and then to extract at least one of the metals from the leach solution during the process comprising the steps of:

contacting a metal containing material containing at least two metals with a ferric fluoborate leachant solution, to form a first leach solution comprising at least two metals;

treating the first leach solution with an extractant which selectively separates at least one metal from the first leach solution forming a first loaded extract and a first raffinate, the first raffinate containing fluoboric acid formed by the extraction step;

adding to the first raffinate a metal oxide of a metal in the first raffinate in an amount which lowers the amount of fluoboric acid in the first raffinate and forming a first acid adjusted raffinate;

electrowinning the first acid adjusted raffinate to form a metal product and to form a ferric fluoborate solution; and recycling the ferric fluoborate solution to the contacting step.

2. The method of claim 1 wherein the metal containing material contains copper and the metal oxide is copper oxide.

3. The method of claim 1 wherein the metal containing material contains lead and the metal oxide is lead oxide.

4. The method of claim 1 wherein the metal containing material contains zinc and the metal oxide is zinc oxide.

5. A method for the hydrometallurgical treatment of metal containing materials containing at least two metals using a ferric fluoborate leach solution to separate at least two of the metals from the metal containing material and then to extract at least one of the metals from the leach solution during the process comprising the steps of:

contacting a metal containing material containing at least two metals with a ferric fluoborate leachant solution to form a first leach solution comprising at least two metals;

treating the first leach solution with a first extractant which selectively separates at least one metal from the first leach solution forming a first loaded extract and a first raffinate, the first raffinate containing fluoboric acid formed by the extraction step;

treating the first raffinate with a second extractant which selectively separates at least one metal from the first raffinate forming a second treated extract and a second raffinate, the second raffinate containing fluoboric acid formed by the extraction step;

adding to the second raffinate a metal oxide of a metal in the second raffinate in an amount which lowers the amount of fluoboric acid in the second raffinate and forming a first acid adjusted raffinate;

electrowinning the first acid adjusted raffinate to form a metal product and to form a ferric fluoborate solution; and recycling the ferric fluoborate solution to the contacting step.

6. The method of claim 5 wherein the first raffinate is acid adjusted.

7. The method of claim 5 wherein the metal containing material is tetrahedrite concentrate.

8. The method of claim 5 wherein the metal containing material is a copper bearing material.

9. The method of claim 5 wherein the metal containing material is a zinc bearing material.

10. The method of claim 5 wherein the metal containing material is a lead bearing material.

* * * * *